(12) United States Patent
Leblanc et al.

(10) Patent No.: US 7,372,663 B2
(45) Date of Patent: May 13, 2008

(54) LUBRICATED LIMITER FOR FLUID DYNAMIC BEARING MOTOR

(75) Inventors: Jeffry A. Leblanc, Aptos, CA (US); Robert A. Nottingham, Santa Cruz, CA (US); Troy M. Herndon, San Jose, CA (US); Norbert S. Parsoneault, Scotts Valley, CA (US); Lynn B. Le, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 581 days.

(21) Appl. No.: 11/084,610

(22) Filed: Mar. 18, 2005

(65) Prior Publication Data

US 2005/0207060 A1 Sep. 22, 2005

Related U.S. Application Data

(60) Provisional application No. 60/554,962, filed on Mar. 19, 2004, provisional application No. 60/554,958, filed on Mar. 19, 2004, provisional application No. 60/554,957, filed on Mar. 19, 2004.

(51) Int. Cl.
*G11B 17/02* (2006.01)
(52) U.S. Cl. .................................................. 360/99.08
(58) Field of Classification Search ..................... None
See application file for complete search history.

(56) References Cited

U.S. PATENT DOCUMENTS

| 4,795,275 A | 1/1989 | Titcomb et al. |
| 4,919,547 A | 4/1990 | Schwartzman |
| 5,284,391 A | 2/1994 | Diel et al. |
| 5,623,382 A * | 4/1997 | Moritan et al. ........... 360/99.08 |
| 5,751,080 A | 5/1998 | Hong |
| 6,034,454 A | 3/2000 | Ichiyama |
| 6,172,847 B1 | 1/2001 | Sakatani et al. |
| 6,339,270 B1 | 1/2002 | Ichiyama |
| 6,361,214 B1 | 3/2002 | Ichiyama |
| 6,982,510 B1 * | 1/2006 | Ajello et al. ................... 310/90 |
| 7,059,772 B2 * | 6/2006 | Oku et al. .................... 384/119 |
| 2003/0234589 A1 * | 12/2003 | Parsoneault et al. ........... 310/90 |
| 2004/0165797 A1 * | 8/2004 | Oku et al. .................... 384/119 |
| 2005/0099722 A1 * | 5/2005 | Nishimura et al. ....... 360/99.08 |
| 2005/0218735 A1 * | 10/2005 | Herndon et al. ............... 310/90 |

FOREIGN PATENT DOCUMENTS

| JP | 3176856 | 7/1991 |
| JP | 7310739 | 11/1995 |

(Continued)

*Primary Examiner*—Allen Cao
(74) *Attorney, Agent, or Firm*—Stephen C. Durant; Novak Druce + Quigg LLP

(57) ABSTRACT

In one example, a FDB motor having a top-cover attached, EM biased bearing system is provided. The motor includes a shaft and rotor disposed for relative rotation, and an axial limiter for restricting axial movement of the rotor with respect to the shaft, wherein the axial limiter is wet or lubricated during contact. The limiter is spatially fixed with respect to one of the shaft or the rotor and disposed with an axial end surface opposing a surface portion spatially fixed with respect to the other of the shaft or the rotor to form a gap therebetween. The gap may be filled with a fluid such as bearing lubricant, thereby providing a lubricated or wet contact surface to restrict axial movement of the shaft and rotor. Additionally, one or both surfaces may include a groove or slot to provide circulation of fluid through the gap.

19 Claims, 4 Drawing Sheets

FOREIGN PATENT DOCUMENTS

| | | |
|---|---|---|
| JP | 9149614 | 6/1997 |
| JP | 9317755 | 12/1997 |
| JP | 2000149395 | 5/2000 |
| JP | 2000235766 | 8/2000 |
| JP | 2002125344 | 4/2002 |
| JP | 2002165409 | 6/2002 |

* cited by examiner

LUBRICATED LIMITER FOR FLUID DYNAMIC BEARING MOTOR

RELATED APPLICATIONS

The present application is related to and claims benefit of priority from U.S. Provisional Patent Application No. 60/554,957, filed on Mar. 19, 2004, U.S. Provisional Patent Application No. 60/554,958, filed on Mar. 19, 2004, and U.S. Provisional Patent Application No. 60/554,962, filed on Mar. 19, 2004, all of which are incorporated by reference as if fully set forth herein.

BACKGROUND

1. Field

Various examples described herein relate generally to features for limiting axial displacement of relatively rotating portions within Fluid Dynamic Bearing (FDB) motors (e.g., a "limiter"), and in particular relates to FDB motors having lubricated or "wet" limiters.

2. Description of Related Art

Disk drives are capable of storing large amounts of digital data in a relatively small area. Disk drives store information on one or more recording media, which conventionally take the form of circular storage disks (e.g. media) having a plurality of concentric circular recording tracks. A typical disk drive has one or more disks for storing information. This information is written to and read from the disks using read/write heads mounted on actuator arms that are moved from track to track across the surfaces of the disks by an actuator mechanism.

Generally, the disks are mounted on a spindle that is turned by a spindle motor to pass the surfaces of the disks under the read/write heads. The spindle motor generally includes a shaft and a hub, to which one or more discs are attached, and a sleeve defining a bore for the shaft. Permanent magnets attached to the hub interact with a stator winding to rotate the hub and disc. In order to facilitate rotation, one or more bearings are usually disposed between the sleeve and the shaft.

Over the years, storage density has tended to increase, and the size of the storage system has tended to decrease. This trend has lead to greater precision and lower tolerance in the manufacturing and operating of magnetic storage disks. Accordingly, the bearing assembly that supports the hub and storage disk is of increasing importance.

One typical bearing assembly used in such storage systems includes a fluid dynamic bearing. In a fluid dynamic bearing, a lubricating fluid such as air or liquid provides a bearing surface between a fixed member of the housing and a rotating member of the disk hub. In addition to air, typical lubricants include gas, oil, or other fluids. Fluid dynamic bearings spread the bearing surface over a large surface area, as opposed to a ball bearing assembly, which comprises a series of point interfaces. This is desirable because the increased bearing surface reduces wobble or runout between the rotating and fixed members. Further, the use of fluid in the interface area imparts damping effects to the bearing, which helps reduce non-repeatable run-out.

One embodiment of a FDB motor includes a magnetically biased motor. That is, the bearing design cooperates with a magnetically biased circuit or element to establish and maintain fluid pressure in the bearing areas by providing an axial magnetic force, especially in designs where the thrust bearing is defined in the gap at the end of the shaft. The magnetic bias may reduce or eliminate the need to provide hydrodynamic grooves on one or more motor elements in order to accomplish the same, which in turn reduces power consumed by the motor. Typically in such systems, however, the only force or structure holding the rotating portion of the motor in place is the axial magnetic force; therefore, if shock axial forces exceed magnetic forces in the motor, the rotor can shift and the disk drive can become damaged or fail.

Accordingly, FDB spindle motors, and particular, those having electromagnetic bias and a single thrust bearing, generally include features to limit the axial displacement of the rotating portions relative to the stationary portions during a shock event. Often such features are referred to as a "shock limiter." A limiter generally limits or reduces the potential for axial displacements of the rotating portions of the motor relative to stationary portions beyond a desired or acceptable range of axial motion. A limiter may be fixed to or form part of a rotating member and separated by a small gap from a stationary portion of the motor. During a sufficiently large shock event the limiter will move axially and contact the stationary portion of the motor, thereby limiting the axial motion of the rotational portion of the motor.

If a shock event occurs during operation, however, the limiter feature will place rotating portions in direct contact with stationary portions. The contacting surfaces may lead to particle generation or gall and lock-up of the motor during contact, in part, because the contacting surfaces are not lubricated, e.g., a dry surface-to-surface contact. Particle generation may result in reduced performance or failure of the spindle motor or disc drive, e.g., contaminating bearing fluid or the like.

SUMMARY

In one aspect, a Fluid Dynamic Bearing (FDB) motor having an axial limiter is provided. In one example, the motor includes a top-cover attached FDB motor system including a shaft portion and a rotor portion disposed for relative rotation. The motor may further include an electromagnetic assembly for providing a magnetic bias along an axial direction. An axial limiter is included to restrict axial movement of the rotor with respect to the shaft. The limiter is spatially fixed with respect to one of the shaft or the rotor and disposed with an axial end surface opposing a surface portion spatially fixed with respect to the other of the shaft or the rotor to form a gap therebetween. The gap is filled with a fluid such as bearing lubricant or the like, thereby providing a lubricated or wet limiter to restrict axial movement of the shaft and rotor. A lubricated or wet limiter may reduce damage during contact relative to typical dry contact limiters.

In some examples, a portion of the limiter surface forming the gap may be grooved to provide a circulation of fluid through the gap. Alternatively or additionally, the opposing surface to the limiter may be grooved. A grooved surface on one or both of the opposing surfaces of the gap may provide a greater average gap width and draw less power from the motor. In other examples, the limiter may be integrated with a reservoir or capillary seal containing fluid such as bearing lubricant or the like.

In another aspect, a disc drive is provided. The disc drive includes a stationary shaft supported by the top cover and hub rotatably mounted to the shaft. A lubricated limiter is further included to restrict axial movement of the hub relative to the shaft.

The present invention and its various embodiments are better understood upon consideration of the detailed description below in conjunction with the accompanying drawings and claims.

BRIEF DESCRIPTION OF THE DRAWINGS

For a fuller understanding of aspects and examples disclosed herein, reference is made to the accompanying drawings in the following description.

DETAILED DESCRIPTION

Figure 1:
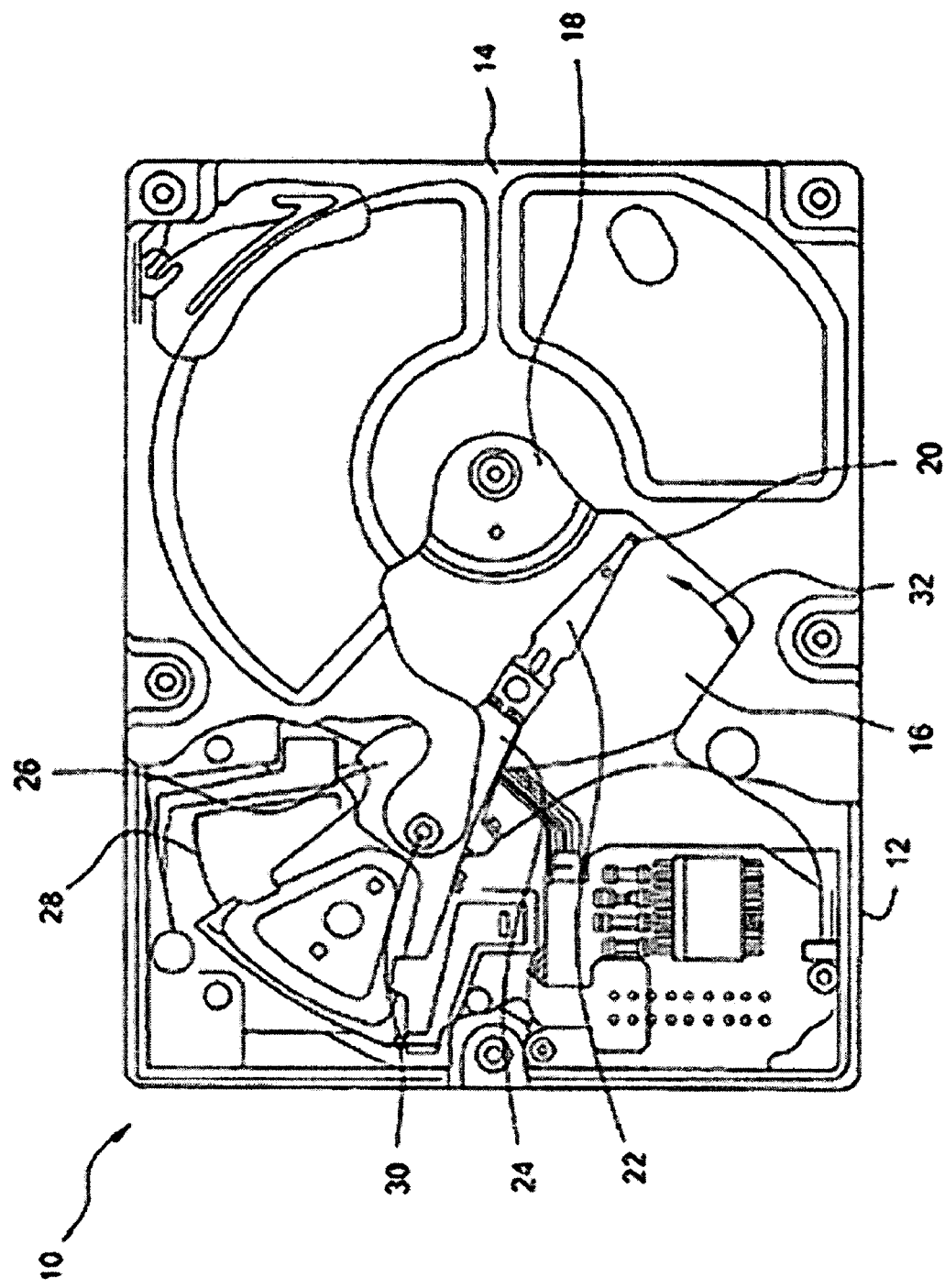
FIG. 1 illustrates a plan view of an exemplary disc drive storage systems.

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of motors, including motors for use in disc storage drives. Motors for disc storage drives may be designed and may operate in a number of ways. The exemplary motors and other exemplary subject matter provided herein are for illustrating various aspects and are not intended to limit the range of motors and devices in which such examples and aspects may be applied.

In one example described herein, an axial shock limiter is incorporated into a FDB spindle motor, wherein the limiter is a lubricated or "wet" limiter. The terms lubricated limiter and "wet" limiter generally indicate that a gap positioned between a surface of the limiter and an opposing surface portion of the motor is fluid filled during relative rotation of the limiter and the opposing surface. Thus, during axial motion a wet or lubricated contact is made between the limiter and an opposing portion of the motor to restrict axial displacement (e.g., no dry surface-to-surface contact during a shock event). A lubricated limiter may reduce the potential for damage caused by direct contact of a rotating portion and stationary portion of the motor during an axial shock. In contrast, a "dry" limiter includes opposing surfaces that do not include a lubricating fluid in the gap such that direct contact made during a shock event has a relatively high potential for damage or reduction in the performance of the system as described previously.

One exemplary spindle motor design that may benefit from a lubricated limiter as provided herein includes a fixed shaft, top-cover attached, EM biased motor, wherein a stationary motor shaft is supported at the top and bottom ends. An exemplary lubricated limiter may provide an axial displacement limit for the rotor relative to the shaft during a shock event that might otherwise overcome the EM bias force.

Additionally, a limiter may include a grooved surface to provide fluid circulation in the gap between the limiter and the opposing surface. For example, limiter features incorporated into FDB motors are typically designed with close gaps and smooth surfaces to reduce potential for damage during a shock event. The close gaps and smooth surfaces, however, may lead to power losses and may provide areas of sub-ambient pressure in the lubricant. The sub-ambient pressure can cause gas ingestion into the lubricant, which can result in reduced motor performance. Accordingly, a grooved limiter may provide an increased average gap distance, thereby reducing power loss over a non-grooved or smooth limiter interface. Further, grooved features associated with the limiter may create pressures greater than ambient pressures, thereby reducing potential for air ingestion into the lubricant.

The limiter may include any suitable bearing type grooves, slots, or other relief features incorporated into the limiter or opposing surface of the motor such that during relative motion between the limiter and opposing surface a pressurized circulation flow of the lubricant is created. Additionally, the lubricated limiter may also form a portion of a capillary seal and/or bearing lubricant reservoir within the FDB motor.

Turning briefly to FIG. 1, a plan view of an exemplary disk drive 10 for use with various aspects described herein is shown. The disk drive 10 includes a housing base 12 and a top cover 14. The housing base 12 is combined with top cover 14 to form a sealed environment to protect the internal components from contamination by elements outside the sealed environment. Disk drive 10 further includes a disk pack 16 that is mounted on a hub 202 (see FIG. 2*a*) for rotation on a spindle motor 200 (see FIG. 2*a*) by a disk clamp 18. Disk pack 16 includes one or more individual disks that are mounted for co-rotation about a central axis. Each disk surface has an associated read/write head 20 that is mounted to the disk drive 10 for communicating with the disk surface. In the example shown in FIG. 1, read/write heads 20 are supported by flexures 22 that are in turn attached to head mounting arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached read/write heads 20 about a pivot shaft 30 to position read/write heads 20 over a desired data track along a path 32. The general configuration and arrangement of disk drive 10 shown in FIG. 1 is illustrative only, and other arrangements of the various components have frequently been used, and aspects provided are not limited by the particular configuration of disk drive 10 shown.

Figure 2A:
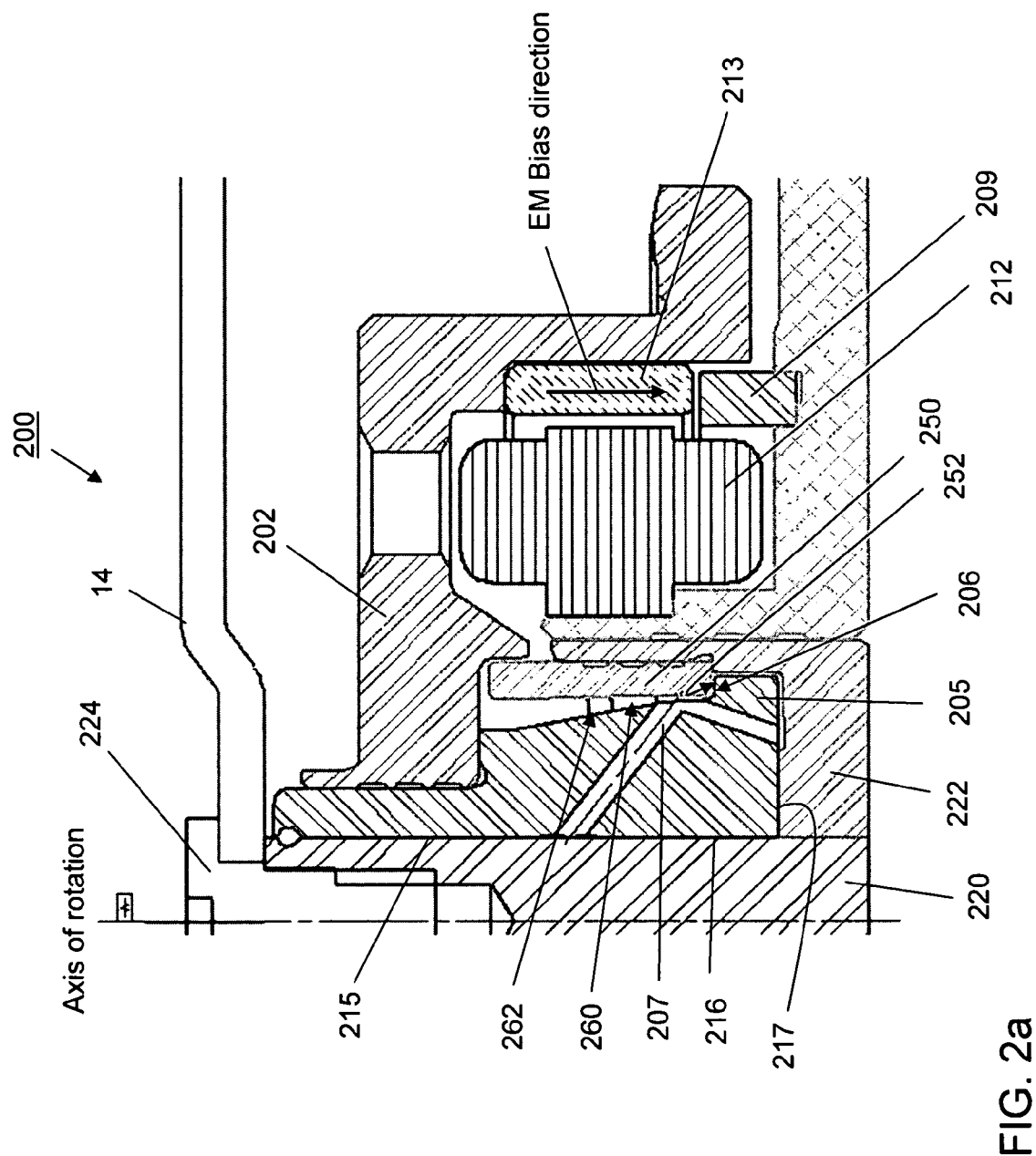
FIG. 2*a* illustrates a side view of a portion of an exemplary motor including an exemplary axial lubricated or wet limiter.

FIG. 2*a* illustrates a portion of an exemplary spindle motor 200 including a lubricated limiter 250 according to one example. In this example, motor 200 generally includes a stationary shaft portion including shaft 220 and thrust cup 222. In particular, shaft 220 is fixed at the lower end with thrust cup 222 and the upper end by screw support 224. Screw support 224 is further fixed with respect to top cover 14 in a top-cover attached configuration.

Motor 200 further includes a rotor portion rotatably mounted to the shaft portion, including sleeve 205 and hub 202 which rotate around stationary shaft 220. An inner radial surface of sleeve 205 and outer radial surface of shaft 220 form a gap therebetween, where one or both of the radial surfaces may include circumferentially disposed groove regions 215 and 216. Groove region 215 and/or groove region 216 may be asymmetrical and may function as pumping seals and/or to recirculate lubricating liquid through portions of motor 200, e.g., recirculation channel 207. A groove region 217 may further be formed between sleeve 205 and thrust cup 222 to form a thrust bearing, for example.

Mounted with shaft 220 and thrust cup 222 is a stator 212 that, when energized, communicates with a magnet associated with hub 202 and induces rotation of hub 202 and sleeve 205 about stationary shaft 220. Stator 212 comprises a plurality of "teeth" (not shown) formed of a magnetic material where each of the teeth is wound with a winding or wire (not shown).

To establish and maintain pressure in the groove region 216, and to bias the rotating assembly, a constant force magnetic circuit is provided comprising magnet 213 supported on the rotating assembly (here mounted on hub 202), and located across a gap from a magnetically conducting steel ring 209 supported on the stationary assembly. Other magnetic circuits or configurations are of course possible. Such a configuration recognizes many advantages; however, a significant disadvantage to magnetically biased fluid dynamic bearing motors of the prior art is that the axial magnetic force is the only force holding the rotating assembly in place in the motor. If other axial forces such as a shock should exceed the magnetic force, then the rotating assembly may fall out of the motor, and the disk drive will fail.

Accordingly, in one example, limiter 250 is included to restrict the axial movement of the rotor portion of motor 200 by means other than the axial magnetic forces. In this example, limiter 250 is a wet or lubricated limiter, wherein the axial surface 252 is disposed opposing a surface portion 206 of sleeve 205. The surface 206 may include a ridge or other surface portion of sleeve 205 in a fixed spatial relationship with sleeve 205. An axial gap (seen more clearly in FIG. 2b) separates the lower axial surface 252 of limiter 250 and the opposing surface 206 of sleeve 205. The axial gap is filled with a fluid, in this example lubricating fluid, which is also used by bearings 215, 216, and 217 of motor 200.

During a shock event or the like which causes axial displacement of sleeve 205 relative to shaft 220, axial surface 252 of limiter 250 contacts opposing surface portion 206 of sleeve 205, wherein a wet contact is made, i.e., the surfaces are within the fluid or lubricant, thereby reducing the potential for generating debris, lock-up, or other deleterious effects on the performance of motor 200. The fluid is generally described herein as a lubricating fluid, such as oil used in conventional hydrodynamic bearings, but this is not intended to be limiting and it should be understood that any suitable fluid may be used in the gap between limiter 250 and an opposing surface portion 206. Further, the gap between limiter 250 and opposing surface portion 206 is not required to be in fluidic communication with other portions of the motor or bearings.

Limiter 250 may be mounted, for example, by press fitting or epoxy bonding into an annular ridge or shoulder portion of thrust cup 222. Additionally, limiter 250 may be formed integral with thrust cup 222, or other portion spatially fixed with respect to hub 220, e.g., an axial surface 252 may simply be formed as part of a motor element and placed in opposition with an opposing surface 206. In other examples, limiter 250 may be similarly fixed with respect to the rotor, e.g., fixed to a portion of sleeve 205, hub 202, or the like, and configured to form an axial gap between an opposing surface associated with a stationary portion of the motor such as thrust cup 222 or the like. It should be noted that the axial surface 252 and opposing surface 206 need not be parallel to each other or perpendicular to the axis of rotation.

Additionally, a surface of limiter 250, and in this particular example, the axial surface 252 may include one or more grooves, slots, or other surface relief formed therein to create a pumping force and circulation of lubricating fluid in the gap between the end surface 252 of limiter 250 and the opposing surface 206 of sleeve 205. Alternatively, the opposing surface 206 of sleeve 205 may include grooves or the like, in addition to or instead of limiter 250, to provide circulation of lubricating fluid. The grooves may include any suitable surface relief, e.g., one or more grooves, lands, pits, or other surface variation formed on one or both of the opposing surfaces to provide a pumping force to the lubricant during relative rotation of limiter 250 and the opposing surface 206.

Figure 2B:
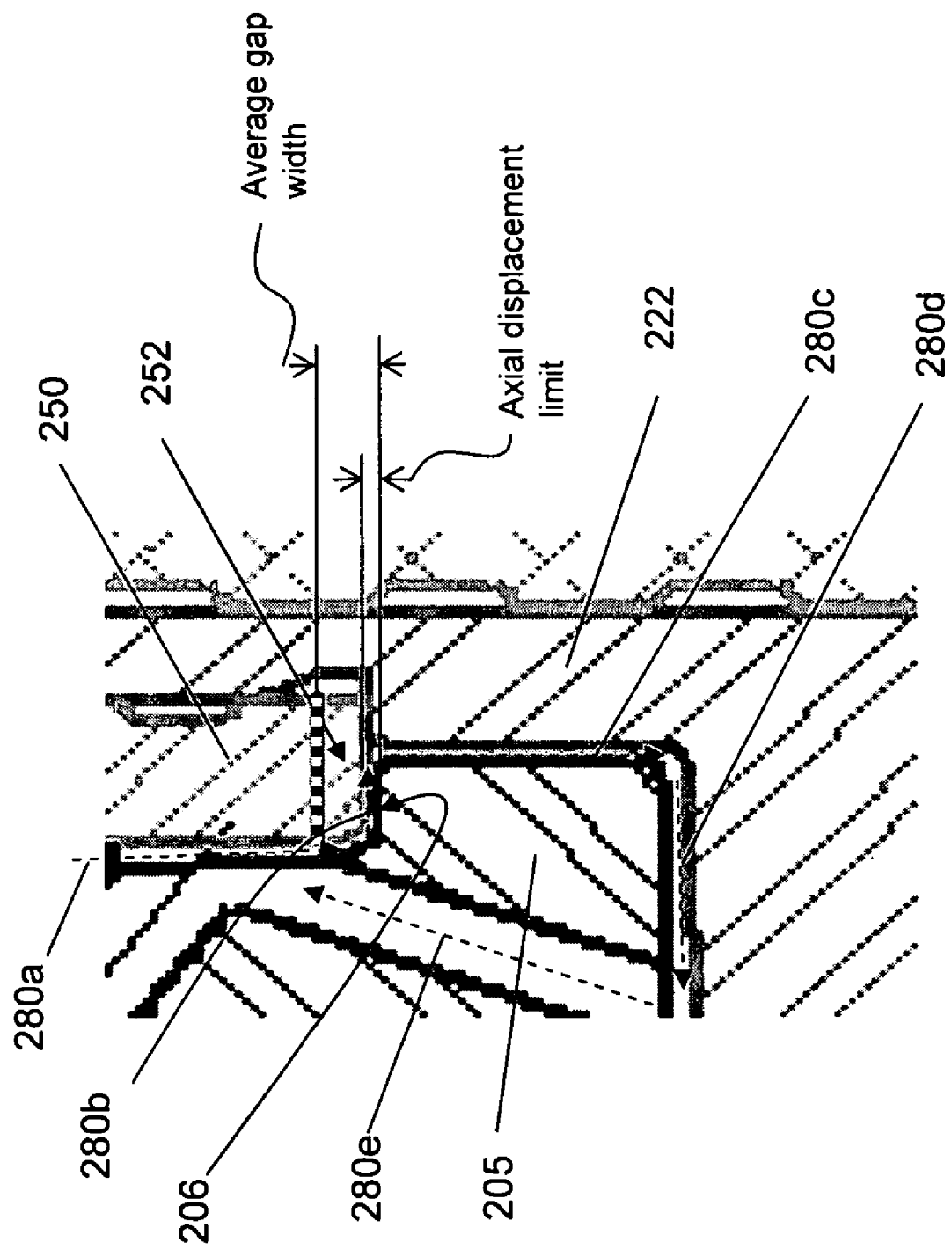
FIG. 2*b* illustrates an exemplary circulation flow in the vicinity of a gap between an axial gap of a limiter and opposing surface.

Grooves formed on one or both of the opposing surfaces, in addition to creating a pumping or pressurized flow of lubricant, may increase the average gap distance between the opposing surface 252 of limiter 250 and surface portion 206. As illustrated in FIG. 2b, the increased average gap distance may reduce power consumed by the motor associated with lubricated limiter 250 during operation and maintain desired axial displacement limits that are less than the average gap distance. For example, a small gap generally draws more power during operation than a relatively larger gap; accordingly, a grooved surface or surfaces may create a larger average gap distance, thereby reducing power consumed by the motor.

The ratio of grooved to non-grooved surface on the axial end of limiter 250 and/or on surface portion 206 may be optimized for power loss, with considerations for groove depth, flow, and contact area to provide desired axial displacements under operational and non-operational shock events.

It should be recognized that exemplary spindle motor 200 is shown here for illustrative purposes only and other motor designs are contemplated and possible for use with exemplary limiter 250. For example, U.S. patent application Ser. No. 10/600,096 entitled "Rotor Limiter for Fluid Dynamic Bearing Motor," which is hereby incorporated by reference as if fully set forth herein, describes additional exemplary motor designs that may be used with aspects described herein.

In another aspect of the present example, a capillary seal 260 is formed between limiter 250 and a portion of motor 200, in particular, a portion of rotating sleeve 205. As illustrated in FIG. 2a, rotating sleeve 205 converges from a wide gap proximate the upper end of limiter 250 to a narrow gap proximate the lower end of limiter 250, forming capillary seal 260 therebetween. FIG. 2a further shows fluid between limiter 250 and sleeve 205 forming a meniscus 262. In this configuration, capillary forces on liquid within capillary seal 260 will draw liquid toward the axial gap associated with limiter 250. Additionally, capillary seal 260 may serve as a reservoir of lubricating liquid for bearings 215, 216, and 217, where th& lubricating liquid passes through the gap between limiter 250 and opposing surface portion 206 to bearing regions of motor 200.

A grooved surface on limiter 250 (and/or the opposing surface portion 206) may additionally provide for air purging of fluid via capillary seal 260. Further, the circulation and pumping force provided may maintain a pressure of the lubricant between the opposing surfaces at a pressure greater than ambient pressure, thereby reducing the potential for gas ingestion by the lubricant in the vicinity of a capillary seal or the like.

In this example, capillary seal 260 is disposed in parallel with bearings 215 and 216, which may reduce the overall height (along the axis of rotation) of motor 200. Further, this particular example may increase the volume of fluid reserve in the motor 200. Those of ordinary skill in the art will recognize, however, that various other designs and configurations of capillary seal 260 and fluid reservoirs are possible (whether used in conjunction with limiter 250 or not).

In one example, limiter 250 includes a cylindrical ring shape fixed to thrust cup 222. In other examples, however, various other shapes and designs are possible. For example, the cross-sectional shape, as seen in FIG. 2a, may include one or more ridges, shoulders, curves, and the like, forming L or S shaped cross-sections, for example. Limiter 250 may also have a reduced axial length than shown, e.g., having a square or flat rectangular cross-sectional shape. Additionally, limiter 250 may include conical portions and may be fixed with respect to shaft 220 in various fashions; for example, limiter 250 may be formed integral with thrust cup 222, shaft 220, or the like.

FIG. 2b illustrates the axial gap between axial surface 252 of limiter 250 and opposing surface portion 206 in greater detail. In particular, FIG. 2b illustrates a circulation flow 280a-e of liquid or lubricant in one example, as shown by the dotted arrows. The circulation flow 280a-e is generally directed from the capillary seal region (flow 280a) through the axial gap between axial surface 252 of limiter 250 and surface portion 206 (flow 280b). The circulation flow then passes between thrust cap 222 and sleeve 205 (flow 280c, 280d) to circulation channels 207 (flow 280e). Thus, in this example, the axial surface 252 is lubricated during relative rotation and contact between axial surface 252 and surface 206. Further, the general circulation of fluid illustrated from capillary seal 260 to bearing surfaces of motor 200 allows capillary seal 260, integrated with limiter 250, to serve as a reservoir for the fluid bearings of motor 200.

Figure 3B:
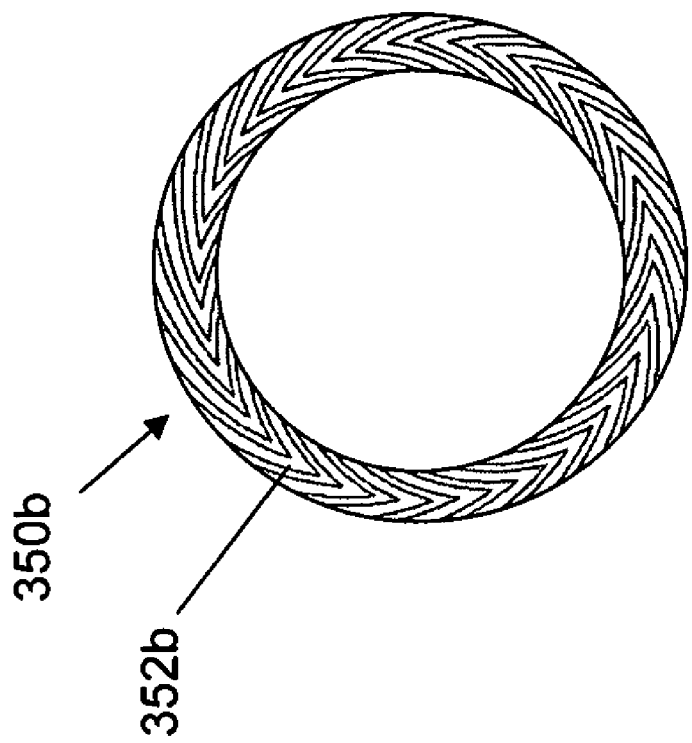
FIGS. 3*a* and 3*b* illustrate exemplary groove patterns that may be employed on one or more portions of an exemplary motor associated with a lubricated limiter.
Figure 3A:
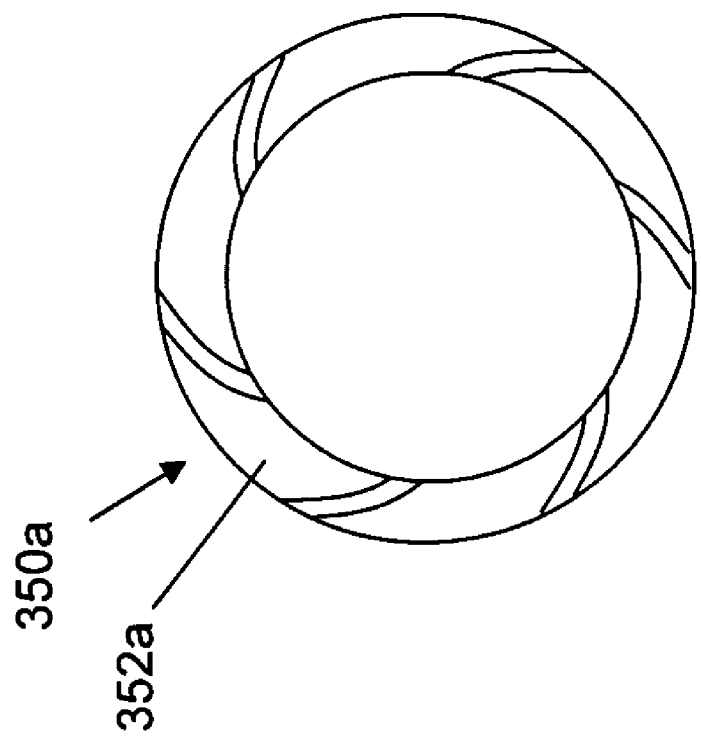

FIGS. 3a and 3b illustrate a few exemplary grooved patterns that may be provided on an axial surface 352a or 352b of a limiter 350a or 350b respectively. Additionally or alternatively, similar relief patterns may be included on an opposing surface to the axial surface of a limiter to provide various advantages described herein. The grooved patterns are illustrative only, and any suitable groove shape or groove pattern may be used.

Various motor and FDB aspects have been illustrated and described herein. One of ordinary skill in the art would understand that teachings related to each may be adapted to other designs. For example, a fixed shaft FDB motor having an EM bias and lubricated limiter has been shown and described, however, it should be understood that aspects of the examples described may be adapted to other rotating designs, such as rotating shaft FDB motor designs and the like. Also, it would be understood that certain components have been separately identified herein, but such identification does not imply that such components must be separately formed from other components. Similarly, components identified herein may be subdivided into sub-components in other designs. Additionally, illustrated features such as recirculation channels, bearing surfaces, pumping grooves, and the like may be disposed additionally or differently than presented in aspects herein.

Other modifications and variations would also be apparent to those of ordinary skill in the art from the exemplary aspects presented. By example, various exemplary methods and systems described herein may be used alone or in combination with various FDB and capillary seal systems and methods. Additionally, particular examples have been discussed and how these examples are thought to address certain disadvantages in related art. This discussion is not meant, however, to restrict the various examples to methods and/or systems that actually address or solve the disadvantages.

We claim:

1. A fixed shaft, fluid dynamic bearing motor system, comprising:
   a shaft and rotor disposed for relative rotation about an axis of rotation; and
   a limiter for restricting axial movement of the rotor with respect to the shaft, the limiter spatially fixed with respect to one of the shaft or the rotor and having an axial end surface opposing a surface portion spatially fixed with respect to the other of the shaft or the rotor, wherein a gap is formed between the axial end surface and the opposing surface portion, the gap being filled with a fluid during relative rotation of the shaft and rotor.

2. The system of claim 1, further including an electromagnetic assembly for providing a magnetic bias along an axial direction.

3. The system of claim 1, wherein the rotor includes a sleeve and a hub, the sleeve forming a bearing surface with the shaft.

4. The system of claim 1, wherein the shaft is supported at both ends.

5. The system of claim 1, wherein the shaft is spatially fixed with respect to a thrust cup and the thrust cup includes the limiter.

6. The system of claim 1, wherein the axial end surface includes at least one groove formed therein.

7. The system of claim 1, wherein at least one of the axial end surface and the opposing surface portion includes at least one groove formed therein.

8. The system of claim 7, wherein the at least one groove creates a circulation of liquid through the gap during relative rotation of the axial end surface and opposing surface.

9. The system of claim 8, wherein the fluid in the gap is further circulated through a fluid dynamic bearing between the shaft and rotor.

10. The system of claim 1, wherein the limiter further forms part of a capillary seal within the fluid dynamic bearings system.

11. The system of claim 1, further including a top-cover attached to the shaft.

12. The system of claim 1, wherein the limiter is integral with a portion of the shaft or the rotor.

13. A disc drive, comprising
   a shaft;
   a hub rotatably supported by the shaft, the hub for rotatably supporting at least one disk;
   a fluid dynamic bearing;
   an electromagnetic assembly for providing a magnetic bias along an axial direction; and
   an axial end surface for restricting axial movement of the hub with respect to the shaft, the axial end surface spatially fixed with respect to one of the shaft or the hub and opposing a surface portion spatially fixed with respect to the other of the shaft or the hub, wherein a gap is formed between the axial end surface and the opposing surface portion, the gap being filled with a fluid during relative rotation of the shaft and hub.

14. The disc drive of claim 13, wherein the shaft is attached on one end to a top cover.

15. The disc drive of claim 13, wherein the shaft is stationary and the axial end surface is spatially fixed with respect to the shaft.

16. The disc drive of claim 13, wherein at least one groove is defined in the axial end surface.

17. The disc drive of claim 13, wherein at least one groove is formed in at least one of the axial end surface and the opposing surface portion.

18. The disc drive of claim 17, wherein the at least one groove creates a circulation of liquid through the gap during relative rotation of the axial end surface and opposing surface.

19. The disc drive of claim 13, wherein the axial surface is disposed adjacent a capillary seal within the fluid dynamic bearings system.

* * * * *